United States Patent

Tonouchi

[19]

[11] Patent Number: 6,072,244
[45] Date of Patent: Jun. 6, 2000

[54] WIND POWER PRIME MOVER

[76] Inventor: Kooji Tonouchi, 376-1, Sengen-cho, 5-chome, Nishi-ku, Yokohama-shi, Kanagawa-ken, Japan

[21] Appl. No.: 08/629,906

[22] Filed: Apr. 9, 1996

Related U.S. Application Data

[63] Continuation of application No. 08/365,322, Dec. 28, 1994, abandoned, which is a continuation of application No. 07/952,633, Nov. 20, 1992, abandoned.

[30] Foreign Application Priority Data

Mar. 20, 1991 [JP] Japan .................................... 3-055215
Aug. 22, 1991 [WO] WIPO ....................... PCT/JP91/01116

[51] Int. Cl.$^7$ ................................................. F03D 9/00
[52] U.S. Cl. ........................................ 290/55; 416/197 A
[58] Field of Search ............................... 416/197, 197 A; 290/55

[56] References Cited

U.S. PATENT DOCUMENTS

| 110,683 | 1/1871 | Savoral | 416/197 A |
|---|---|---|---|
| 387,102 | 7/1888 | Nagel | 416/91 |
| 426,162 | 4/1890 | Ball | 74/41 |
| 727,762 | 5/1903 | Edgar | 416/178 |
| 752,764 | 2/1904 | Dunne | 417/35 |
| 1,656,485 | 1/1928 | Hohlt | 416/197 A |
| 1,812,741 | 6/1931 | Espinosa | 415/4.4 |
| 2,094,942 | 10/1937 | Frye | 416/197 A |

FOREIGN PATENT DOCUMENTS

| 2452009 | 11/1980 | France | 416/197 A |
|---|---|---|---|
| 3103536 | 8/1982 | Germany | 416/197 A |
| 3439759 | 5/1986 | Germany | 416/197 A |
| 59383 | 4/1983 | Japan | 416/197 A |

*Primary Examiner*—Steven L. Stephan
*Assistant Examiner*—Nicholas Ponomarenko
*Attorney, Agent, or Firm*—Elliot M. Olstein; Raymond J. Lillie

[57] ABSTRACT

A wind power prime mover in which a windmill assembly (1) comprising semicylindrical wind receiving members (16) vertically erected on a plurality of equally spaced points on the circumference centering on a vertical rotary shaft (3) in such manner that semicylindrical open parts of said wind receiving members are directed to the same circumferential directions with respect to individual tangents to said circumference is of knock-down assembly construction with the major parts thereof joined to or disjoined from each other with bolts; and the top and bottom of said rotary shaft (3) are supported by bearings (10), (11) in a supporting framework composed of a support pillar (2), central support frame (8), upper frame (6), and lower frame (9), whereby a wind power prime mover hardly affected by instantaneous variation of wind velocity, comparatively free in selection of installation site, and manufacture, transport, assembly, and maintenance can be provided easily.

2 Claims, 2 Drawing Sheets

WIND POWER PRIME MOVER

This application is a continuation of application Ser. No. 08/365,322, filed Dec. 28, 1994, abandoned, which is a continuation of application Ser. No. 07/952,633, filed Nov. 20, 1992, abandoned.

FIELD OF TECHNOLOGY

The present invention relates to a wind power prime mover which is suitable for a power generating equipment by wind power.

BACKGROUND TECHNOLOGY

As a part of the energy problems which have been raised in recent years, the extensive utilizations of natural energy such as wind power, water power, sunrays and so forth have attracted general attention, and various kinds of motive and power generating equipments has been proposed and developed. Among them, concerning the electricity generation by wind power, considerably large scaled electricity generating equipments by wind power has been installed and operated in test run.

However, as these kinds of conventional electricity generating equipments by wind power are mostly assembled by the two sail arm propellers rotating in a vertical level having horizontal rotary shaft, they needed a considerably large diameter for increasing the power generating capacities, therefore the total height of central supporting device had been very tall, and they had difficulties that their manufacturing, installation and maintenance costs including their structures, mechanical strength and maintainability were going to increase, and also, their locations of installation were restricted to the limited areas. Furthermore, as their inertial moments of rotary parts were comparatively smaller for their large scaled dimensions, their rotating speeds and torques were going to vary by an instantaneous variation of wind velocity.

The present invention has been executed and improved in consideration to the above mentioned prior aspects of the electricity generation by wind power. Therefore the invention aims to provide a wind power prime mover which is hardly affected by an instantaneous variation of wind velocity, of which costs of manufacturing, transport, assembly and maintenance are comparatively reasonable, and which is suitable for the electricity power generating equipment being hardly restricted to the location of installation.

DISCLOSURE OF THE INVENTION

The present invention, therefore, aims to execute the above-mentioned objects by constructing a wind power prime mover in which a windmill assembly comprising semicylindrical wind receiving members vertically erected on a plurality of equally spaced points on the circumference centering on a vertical rotary shaft in such manner that semicylindrical open parts of said wind receiving members are directed to the same circumferential directions with respect to individual tangents to said circumference and of knock-down-assembly construction with the major parts thereof joined to or disjoined from each other, and each of the top and bottom of said vertical rotary shaft are supported.

By the above mentioned construction, this wind power prime mover can be designed to have comparatively lower height, as its plural semicylindrical wind receiving members are being horizontally rotated centering on a vertical rotary shaft. In addition this prime mover is hardly affected by an instantaneous variation of wind velocity due to the flywheel effect being a fairly big rotary inertia moment. Furthermore, as the said prime mover is constructed with the major parts thereof joined to each other, the selection of its location is found easily and freely, and the costs of manufacturing, delivery, assembling and construction of the said prime mover are reasonable, and the said prime mover can be installed, for example, on the roof of the building, and its maintenance is easily executed because its height from the ground or from the floor is low.

PREFERRED EMBODIMENT OF THE INVENTION

Figure 1:
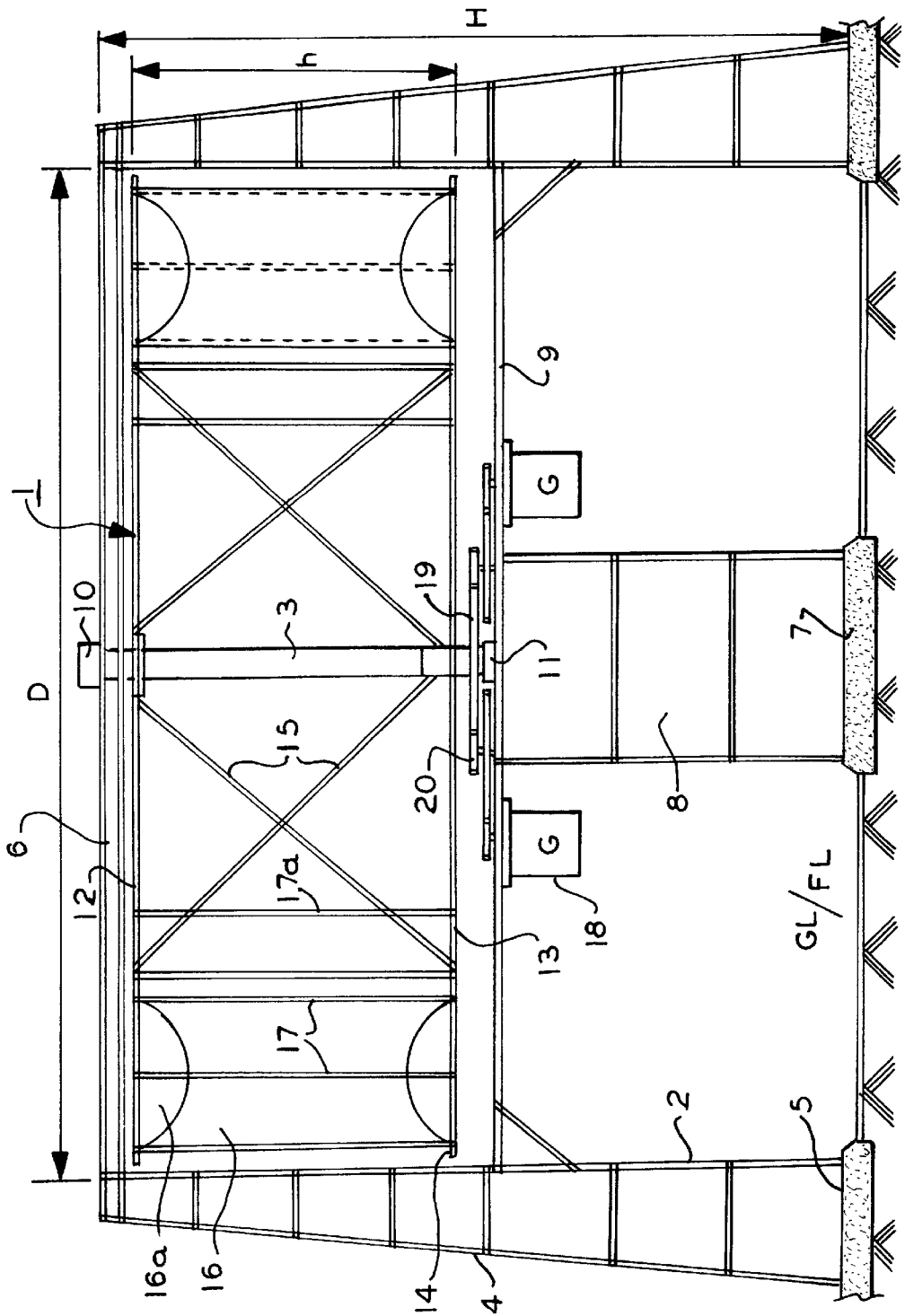
FIG. 1 shows an outline side view of an embodiment of power generator utilizing a wind power prime mover of the present invention.

Preferred embodiments of the present invention will now be described in detail with reference to the accompanying drawings Referring first to FIG. 1, an outline side view of an embodiment of power generator in relation to the present invention, shows that a wind power prime mover (hereinafter referred to as Windmill) 1 is installed on the ground level (GL) or on the floor level (FL), in which Windmill 1 is constructed with rotating horizontally around a vertical rotary shaft 3 inside eight supports 2, opposite diameter of which are disposed under regular octagonally. Outside of each support 2 is provided with reinforcing support 4, and these supports 2 and 4 are fixed and installed upon each basic concrete 5 on the ground level GL or floor level FL, in which an upper frame 6 is composed of each frame member 6a mutually connecting between the adjacent supports and also between the diametrically opposed supports at the top of each support.

On the other side, a central support frame 8 having adequate height is formed upon the basic concrete 7 on the ground level GL of the center of the octagon being formed to each support 1. Then, a lower frame 9 is constructed with each frame member similar to the aforementioned upper frame 6, including its top members.

A Windmill 1 has each upper/lower rotating members 12/13 extending radially from each vertically rotating shaft with equally spaced eight angles in which the top parts of each member 12/13 are jointly reinforced by circular members 14 , and each set of upper/lower rotating members 12/13 corresponding to the upper and lower sides applied and reinforced in hardness by a reinforcing members 15 as diagonal members independently disposed in X shape.

In the insides of each circular members 14 between a set of each upper/lower rotating members 12/13 corresponding to the upper and lower sides, semicylindrical wind receiving members 16 having semicircular cross section are mounted firmly and vertically in such manner that their semicylindrical open parts are directed to the same circumferential directions with respect to individual tangents to said circumferenece, and a regulating plate 17 having a shape of vertical flat board is mounted firmly at the both of two vertical extreme parts and center of said semicylindrical open parts, and also a regulating plate 17a broader than said regulating plate 17 is mounted firmly at a little to center of said inside vertical extreme parts. Also, each of an upper and a lower extreme parts of each wind receiving members 16 are formed in slope by each semicircular plate 16a. A horizontal regulating plate having a plurality of radial directions may be disposed on said vertical regulating plates 17 and 17a.

Furthermore, said major composing parts of Windmill are of assembly construction manufactured by mainly angle steel and steel plate thereof joined to each other with bolts, and therefore, its dismantling, transport, assembly, maintenance and so forth are designed to be of easy care.

Figure 2:
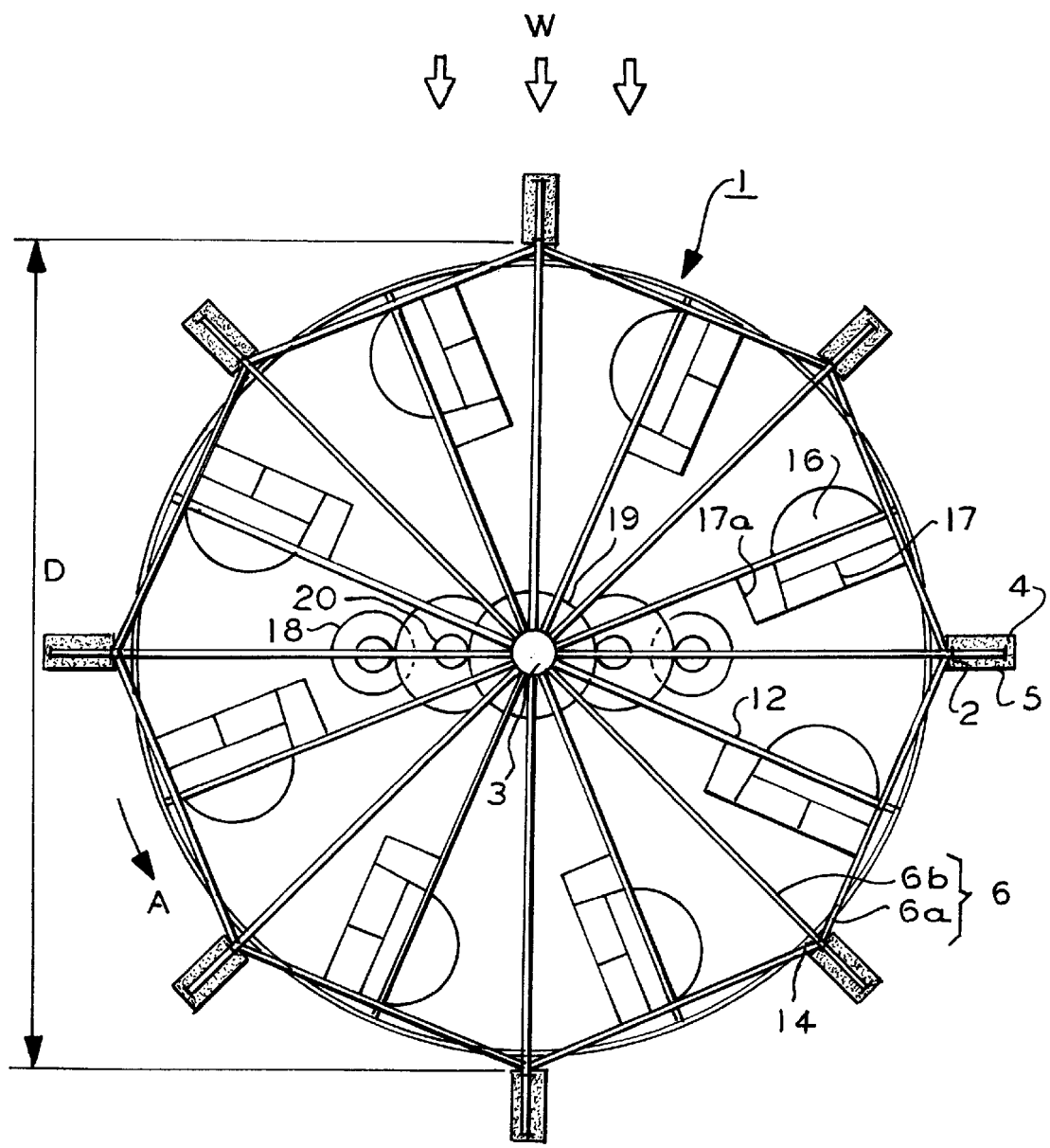
FIG. 2 is a top view of FIG. 1.

Based upon the said construction, in FIG. 2, if this Windmill 1 receives wind from the direction of the arrow, Windmill is under a high motive pressure within the semicylindrical inside of each wind receiving members 16 in the left side of the drawing, meanwhile, in the right side of the drawing, the resistance to wind power is smaller because of smooth circumference of semicyrindical parts. Windmill 1 generates rotary power rotating to the direction A of arrow by rotating power generated from the difference between the resistance values of wind power of said both left and right sides. And also this Windmill has fairly big rotary inertia moment from its structure, then it can be expected to provide a big flywheel effect, thereby it is hardly affected by an instantenous variation of wind velocity after it starts the rotation.

To transmit the said motive power of Windmill 1 to a set of power generator 18 mounted on the lower frame 9, a big toothed wheel 19 is firmly mounted on the lower part of rotary shaft 3 concentrically, and a small toothed wheel (pinion) 20, which is in gear with a big toothed wheel 19 respectively and is for the multiplying purpose, is also firmly mounted on a separate shaft respectively at the opposed diametrical location. Another big toothed wheel is mounted at the lower part of each pinion 20 which is constructed for multiplying each power generator by the rotary power of each second pinion shaft being mounted upon said each separate shaft.

Furthermore, for the purpose of speed regulating of power generator 18 by wind W, overload of power generator 18, and others, a braking system may be equipped to support compulsorily each circular material 14 as the parts braked at the upper and lower parts of Windmill, which is utilized to stop Windmill when maintenance and inspection are required.

The feasibility study of Windmill was carried out and its practibility was confirmed by the executions of measuring the friction torque caused by stopping and rotating, testing the rotation by large scaled motor fan and others; the feasibility study of power generating equipment of which is constructed in the aforementioned manners and ways, and is manufactured experimentally with the measurements of outer frame diameter, D=6.06m, total height, H=6.0m, and height of Windmill, h=2.6m.

Said embodiment is described by the drawing utilized Windmill 1 equipped eight wind receiving members, however, numerous modifications and variations of the present invention are possible using the different numbers of disposing members, structure details and others.

Also, in the said embodiment, example of operation by a pair of power generators 18 is described, this is used not only a power generator but utilized as power sources for general purpose motive machines thereby adopting naturally a various kind of speed acceleration and reduction systems.

INDUSTRIAL AVAILABILITY

As aforementioned, wind power prime mover of the present invention is constructed in the assembly comprising a plurality of semicylindrical wind receiving members horizontally rotating around vertically erected rotary shaft equally spaced and disposed on the circumference of Windmill, therefore this prime mover is expected to have comparatively greater flywheel effect, has also not so tall, and is constructed with the major parts thereof joined to each other, the selection of its location is comparatively found easily and freely, and it is very advantageous for manufacturing, transferring. assembling and maintenance.

What is claimed is:

1. A wind power prime mover, comprising:

(a) a vertical shaft;
   (b) a plurality of paired upper and lower rotating members extending radially from said shaft and spaced equally along a circumference;
   (c) a wind receiving member mounted vertically at a peripheral position between each pair of upper and lower rotating members, each wind receiving member including (i) a semi-cylindrical member having a concave open portion for receiving wind, and an apex portion, (ii) an upwardly sloping top plate, and (iii) a downwardly sloping bottom plate, wherein each of said top plate and said bottom plate is attached to said semi-cylindrical member, and said top plate slopes upwardly in a direction originating at the apex portion and extending upwardly to said concave open portion, and said bottom plate slopes downwardly in a direction originating at the apex potion and extending downwardly to said concave open portion, wherein each of said wind receiving members is mounted with the semi cylindrical member oriented tangentially to the direction of the radially extending upper and lower rotating member;
   (d) a first vertical wind regulating plate disposed in front of each wind receiving member; and
   (e) a second vertical wind regulating plate disposed between each of said paired upper and lower rotating members and between each wind receiving member and said shaft.

2. The wind power prime mover of claim 1 and further comprising a horizontal regulating plate attached to at least one of said first vertical regulating plate and said second vertical regulating plate, said horizontal regulating plate being capable of being disposed in a plurality of radial directions.

* * * * *